8752X
N. J. Lampman,
Wood Auger.
Patented Apr. 8, 1835.
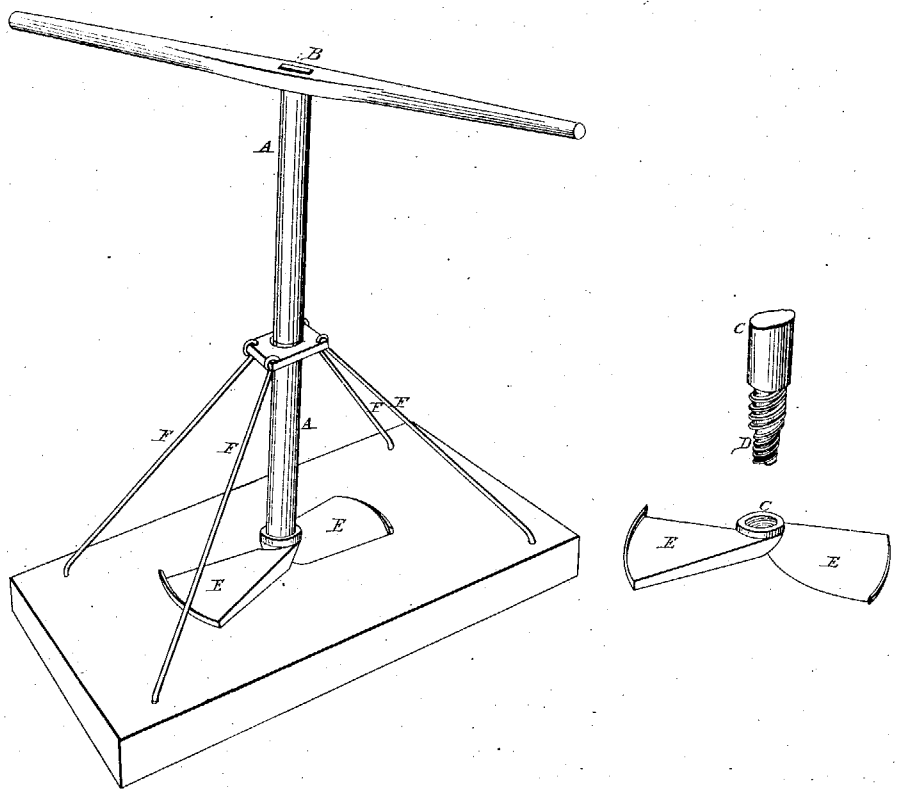

Nicholas I. Lampman of Coxsackie N. York,

Letters Patent,

The schedule referred to in these Letter Patent and making part of the same, containing a description in the words of the said Nicholas I. Lampman, himself of his improvement in the Auger for boring large holes in timber.

To all to whom these presents shall come,
Be it known that I Nicholas I. Lampman of the Town of Coxsackie County of Green and State of New York have inventea a new and useful Instrument or Auger for boring a large hole for the female screw of large wooden screw presses and for other purposes where large cylindrical holes are required in timber; and that the following is a true and exact description of the construction and operation of said instrument or auger as invented by me It consists of a round iron shaft; of from three to four feet in length and about an inch and a half in diameter, on one end of this shaft there is a square tenon that fits a mortice in the middle of the cross bar. by which the auger is turned when in operation, about four inches of the other end is somewhat reduced in size and has a coarse screw thread on it as far as it screws into the cutting part or lips of the instrument. & the remaining part (being about two inches and a half) which extends beyond the lips or cutting part commonly called the worm, is still further reduced in size and has a finer thread on it for the purpose of feeding the auger or regulating its progress when in use, the cutting part or lips of the auger is the same in the principles of its construction as the common screw auger except that it is much larger, is separate from the shaft, has a hole in the middle with a female screw in it to receive the large portion of the screw near the end of the shaft above described, so that augers of different sizes may be fixed to the same shaft when required, To keep the shaft steady when in operation, there is an instrument called a crab consisting of an iron plate about two inches and a half square, with a hole in the centre, sufficiently large to admit the shaft and a small hole at each corner, for fastening on four iron hooks of about fifteen inches in length the other extremity of the hooks being sharp, and bent so as to fasten into the wood on the outside of the circle of the hole to be bored, and so as to raise the plate through which the shaft passes about a foot from the surface of the timber The crab being adjusted and a hole being first bored quite through the timber with a common auger of a size sufficient to admit the worm of the large one, the instrument is put in operation by two men one at each end of the cross bar, or it may be operated on by any other power,

What I claim as an improvement in the construction and application of the instrument or auger as above described to the purpose of boring a large hole at a single operation instead of the usual method hitherto employed of boring several holes with a small auger on the circumference of a circle and cutting them into one with Chisels, thus performing in one hour, the work of a day, in the ordinary method, while the execution of it is much superior and more workmanlike. —

Witnesses

A. D. Spoor
Robt. H. Van Bergen

Nicholas I. Lausman

650 [illegible]

(Patented 8 April 1835)

(Drawing)